(12) United States Patent
Ankel et al.

(10) Patent No.: US 9,066,302 B2
(45) Date of Patent: Jun. 23, 2015

(54) TTI CHANNEL ARRANGEMENT AND UE TO CHANNEL ASSIGNMENT

(75) Inventors: Pär Ankel, Nödinge (SE); Jan Lindskog, Pixbo (SE); Rikard Käer, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1093 days.

(21) Appl. No.: 12/809,845

(22) PCT Filed: Dec. 21, 2007

(86) PCT No.: PCT/SE2007/051074
§ 371 (c)(1),
(2), (4) Date: Jun. 21, 2010

(87) PCT Pub. No.: WO2009/082310
PCT Pub. Date: Jul. 2, 2009

(65) Prior Publication Data
US 2010/0278134 A1    Nov. 4, 2010

(51) Int. Cl.
*H04J 3/00* (2006.01)
*H04W 52/14* (2009.01)
*H04W 52/28* (2009.01)
*H04W 52/34* (2009.01)
*H04W 72/12* (2009.01)

(52) U.S. Cl.
CPC .......... *H04W 52/146* (2013.01); *H04W 52/286* (2013.01); *H04W 52/343* (2013.01); *H04W 72/121* (2013.01)

(58) Field of Classification Search
None
See application file for complete search history.

(56) References Cited

U.S. PATENT DOCUMENTS

| 7,688,796 | B2 * | 3/2010 | Pan et al. ................... 370/342 |
| 7,756,543 | B2 * | 7/2010 | Englund et al. ............ 370/342 |
| 7,890,113 | B2 * | 2/2011 | Jones et al. ................. 455/447 |
| 8,050,222 | B2 * | 11/2011 | Maeda et al. ............... 370/329 |
| 2006/0114877 | A1 * | 6/2006 | Heo et al. ................... 370/342 |
| 2006/0176869 | A1 | 8/2006 | Cheng et al. |
| 2007/0049309 | A1 | 3/2007 | Pan et al. |
| 2007/0223405 | A1 | 9/2007 | Jiang et al. |
| 2008/0182594 | A1 * | 7/2008 | Flore et al. ................. 455/458 |

FOREIGN PATENT DOCUMENTS

EP   1 760 962 A1   8/2006
WO   WO 2007/044414 A1   4/2007

OTHER PUBLICATIONS

Ericsson: "E-DCH Downlink Timing Relations". TSG-RAN WG1#40. R1-050186. Feb. 14-18, 2005. Scottsdale, AZ.
Universal Mobile Telecommunications System (UMTS); Physical channels and mapping of transport channels onto physical channels (FDD) (3GPP TS 25.211 v7.3.0, Release 7). ETSI TS 125 211 v7.3.0 (Oct. 2007).

(Continued)

*Primary Examiner* — Faruk Hamza
*Assistant Examiner* — Aixa A Guadalupe-Cruz

(57) ABSTRACT

A method and apparatus for operating a high speed uplink base station is provided. The base station is adapted to communicate with a first type of user entities and a second type of user entities. The first type of user entities communicate in a first transmission interval and the second type of user entities communicate in a second transmission interval.

24 Claims, 15 Drawing Sheets

(56) References Cited

OTHER PUBLICATIONS

Universal Mobile Telecommunications System (UMTS); UTRAN Iub interface NBAP signalling (Release 6). ETSI TS 125 433 v6.0.0 (Dec. 2003).

3rd Generation Partnership Project; Technical Specification Group Radio Access Network; Physical channels and mapping of transport channels onto physical channels (FDD) (Release 9). 3GPP TS 25.211 v9.2.0 (Sep. 2010).

3rd Generation Partnership Project; Technical Specification Group Radio Access Network; Multiplexing and channel coding (FDD) (Release 9). 3GPP TS 25.212 v9.5.0 (Mar. 2012).

3rd Generation Partnership Project; Technical Specification Group Radio Access Network; Spreading and modulation (FDD) (Release 9). 3GPP TS 25.213 v9.2.0 (Sep. 2010).

3rd Generation Partnership Project; Technical Specification Group Radio Access Network; Physical layer procedures (FDD) (Release 9). 3GPP TS 25.214 v9.8.0 (Mar. 2012).

3rd Generation Partnership Project; Technical Specification Group Radio Access Network; Medium Access Control (MAC) protocol specification (Release 9). 3GPP TS 25.321 v9.10.0 (Dec. 2012).

* cited by examiner

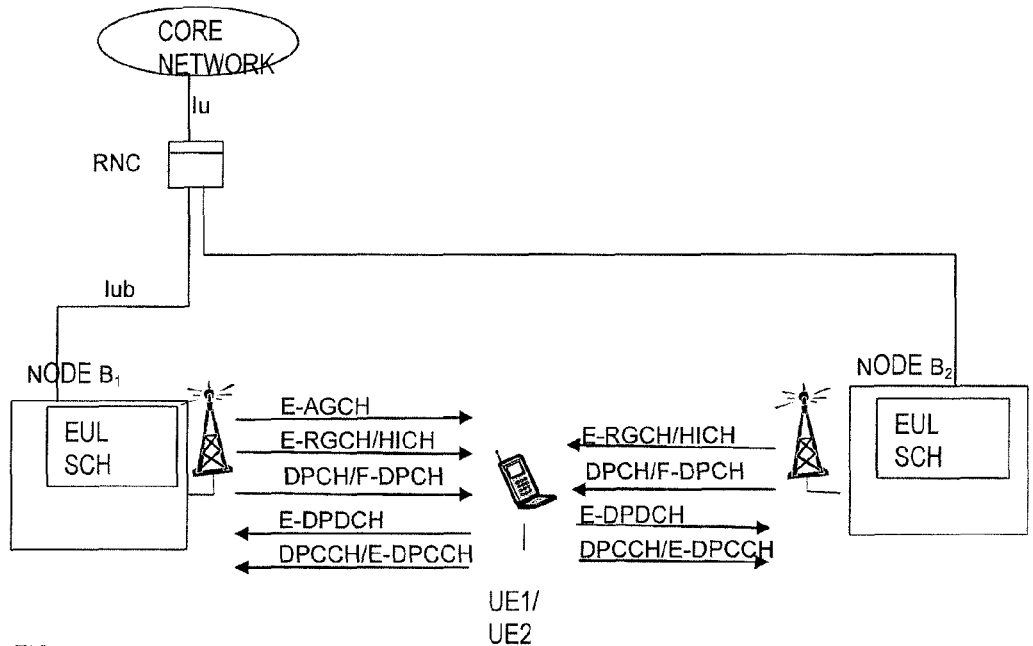
FIG. 1 – PRIOR ART
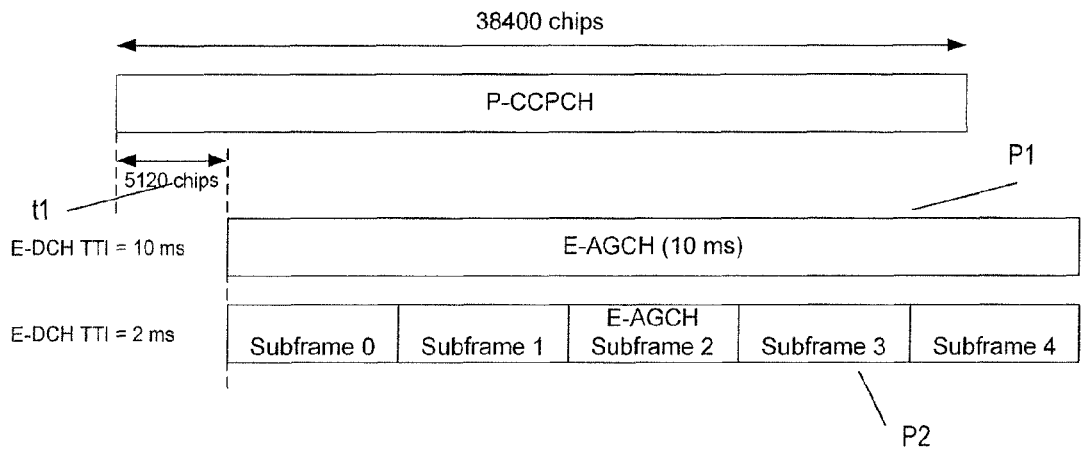
FIG. 2 – PRIOR ART
FIG. B3 – PRIOR ART
– MIX CHANNEL
ARRANGMENT
FIG. 3 – PRIOR ART

| TIME→ | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| INCOMING/ LEAVING(-) UE TYPE | - | 2 | 2 | 2 | 2 | 10 | 2 | 10 | 2 | 2 | -10 | -2 | -2 | -2 |
| ASSIGNED TO/LEAVING A/B | - | A | B | A | B | A | B | B | A | A | A | B | B | B |
| LOAD A | 0 | 1 C2 | 1 C2 | 2 C2 | 2 C2 | 7 M | 7 M | 7 M | 8 M | 9 M | 4 C2 | 4 C2 | 4 C2 | 4 C2 |
| LOAD B | 0 | 0 | 1 C2 | 1 C2 | 2 C2 | 2 C2 | 3 C2 | 8 M | 8 M | 8 M | 8 M | 7 M | 6 M | 5 C1 |

FIG. 19

TTI CHANNEL ARRANGEMENT AND UE TO CHANNEL ASSIGNMENT

FIELD OF THE INVENTION

This invention is directed to HSUPA (HSPDA) base stations and networks operating with both 2 and 10 ms TTI capable devices.

BACKGROUND

In release 6 of the WCDMA (Wideband Code Division Multiplex Access) specification, a High Speed Up-link Packet Access (HSUPA (also called Enhanced Uplink)) communication scheme is defined in addition to the downlink High Speed Packet Data Access (HSPDA) scheme in order to match the bit rates provided by the latter, so as to cater for improved interactive, background and streaming services. In prior art document 3GPP TS 25.309 "FDD Enhanced Uplink Overall description", the Enhanced UL is described.

In FIG. 1, a HSUPA network overview (HSDPA related channels are not included in the picture) is indicated. The network comprises a Core Network communicating with a Radio Network Controller (RNC) over the Iu interface; a first base station, Node B ($B_1$), a second base station, Node B ($B_2$), both base stations comprising an EUL scheduler unit. The EUL Scheduler is also denoted the MAC-e Scheduler, and communicating with the RNC over respective Iub interfaces.

The following HSUPA channels are transmitted over the air interface; the E-AGCH to convey absolute grant signaling from the MAC-e scheduler towards the UEs, the E-RGCH for relative grant signaling, E-HICH to convey acknowledgement feedback from Node-B decoding of UE transmitted data, Dedicated Physical Channel (DPCH) or Fractional DPCH to convey Transmit Power Control (TPC) commands, Enhanced DPDCH (E-DPDCH) to convey the MAC-e payload and Enhanced DPCCH (E-DPCCH) to convey the control signaling of the MAC-e.

Node B1 constitutes the serving cell in this example (E-AGCH is only transmitted from the serving cell), while node B2 constitutes a non-serving cell.

According to the HSUPA specification, the Enhanced Dedicated Channel (E-DCH) high speed uplink transport channel offers a number of new features such as: short Transmission Time Interval (TTI), Fast Hybrid Automatic Repeat Request (ARQ) with soft recombining, fast scheduling for reduced delays, increased data rates and increased capacity.

When a UE is setting up communication with a Node B, 3G paging signals, etc, the setup procedure may be followed by a HSDPA session, for e.g. downloading/surfing an internet page using TCP. Depending on the capabilities of the user entity, this may moreover involve HSUPA transmissions whereby Node B, transmits TCP messages on the E-DPDCH downlink channel which is part of the HSUPA standard and speedy TCP replies are being transmitted on the up-link to Node B. It has been shown that the speed with which the UE can respond over the uplink to Node B, via the TCP protocol, has an impact on the overall downloading speed of larger files from Node B.

After the user entity has been made ready to use a HSUPA service with Node B, the user entity is informed about which E-AGCH code it is supposed to receive absolute grants.

E-AGCH channels are configured to a Node B in a configuration or re-configuration procedure with the RNC via the NBAP signaling protocol. The NPAB E-AGCH channel allocation for a serving radio link (RL) is shown in FIG. 16. Subsequently, downlink traffic is scheduled to UE's on the E-AGCH channelization code in a time multiplexed manner.

One type of message transmitted on the downlink E-AGCH channel are "absolute grants", that is, messages which grant the user entity, the right to transmit at given bit rates on the up-link. The Node B MAC-e Scheduler issues the absolute grants. Since, bandwidth needs vary dynamically over time; it is beneficial that the power emissions by user entities are regulated speedily, so that bandwidth is not unnecessarily wasted.

The E-AGCH can be defined to have a number of one to several channelization codes (presently, up to four (4)), which number is typically less than the number of E-DCH radio links (RL's) in the cell. The actual number of E-AGCH codes available varies dynamically (but on a rather long time base) over time, the allocation being settled according to procedures between Node B and the RNC. This procedure is shown in FIG. 17.

Since the (number of) E-AGCH channelization codes are limited and since the cell capacity is code and power limited, it is preferred to use as few codes as possible for the E-AGCH transmission. For a MAC-e Scheduler that is changing grants for the UE's frequently, it is important to use the E-AGCH channel efficiently.

Two modes of operation, a 10 ms TTI (Transmission Time Interval) mode and a 2 ms TTI mode are specified by 3GPP. All UE Categories support 10 ms TTI. Category 2, 4 and 6 has 2 ms TTI as an option. Maximum peak rate is 2 Mbps in 10 ms HSUPA TTI and 5.76 Mbps with 2 ms HSUPA TTI. When 4 codes are transmitted in parallel, two codes shall be transmitted with SF2 and two with SF4.

TABLE 1

UE Categories in HSUPA, 3GPP TS 25.306

| HSUPA category | Maximum number of HSUPA codes transmitted | Minimum spreading factor | Support for 10 and 2 ms HSUPA TTI | Maximum number of bits transmitted within a 10 ms HSUPA TTI | Maximum number of bits transmitted within a 2 ms HSUPA TTI | Maximum Bit rate |
|---|---|---|---|---|---|---|
| Category 1 | 1 | SF4 | 10 ms TTI only | 7296 | — | 0.73 Mbps |
| Category 2 | 2 | SF4 | 10 ms and 2 ms TTI | 14592 | 2919 | 1.46 Mbps |
| Category 3 | 2 | SF4 | 10 ms TTI only | 14592 | — | 1.46 Mbps |
| Category 4 | 2 | SF2 | 10 ms and 2 ms TTI | 20000 | 5837 | 2.92 Mbps |
| Category 5 | 2 | SF2 | 10 ms TTI only | 20000 | — | 2.00 Mbps |
| Category 6 | 4 | SF2 | 10 ms and 2 ms TTI | 20000 | 11520 | 5.76 Mbps |

It is likely that only UE Categories capable of handling exclusively of 10 ms TTI will be initially available at the marketplace. Dependent on market success and market demands, it is to be expected that 2 ms capable devices will become available at a later stage.

FIG. 2, corresponding to 3GPP TS 25.211, shows that the transmissions on the E-AGCH for 10 ms TTI's and 2 ms TTI sub-frames are required to be aligned. For both TTI types, the delay is set to 5120 chips in relation to the P-CCPCH channel.

In a prior art scenario, as demonstrated in FIG. 3, where there is a mixture of UE's in a given cell and where some UE's are capable of handling at least 2 ms TTI (in the following referred to as second interval TTI type UE's) and some exclusively 10 ms TTI (first interval TTI type UE's), Node B arranges one or more 2 ms TTI UE's and one or more 10 ms TTI on the same E-AGCH channelization code, i.e. radio link (RL). In the FIG. 3 example, there is a 8 ms transmission gap in case the MAC-e scheduler decides to first transmit an absolute grant to the 2 ms TTI UE and thereafter to the 10 ms TTI UE. "Transmission gaps" on the E-AGCH are likely to arise since the timing properties should fulfill the basic requirement to the starting time as illustrated in FIG. 2. This E-AGCH usage is inefficient and unnecessary extra delays are likely to occur.

It is noted that in the above scenario, the 10 ms TTI are allowed to start on points in time which is an integer number of 10 ms TTI intervals from the given reference time shown in FIG. 2. In-between, the 10 ms TTI transmissions, a number of 2 ms TTI transmissions can take place.

SUMMARY OF THE INVENTION

It is a first object of the invention to facilitate an economic channel resource assignment in a HSUPA base station, in particular an efficient utilization of a shared downlink control resources.

This object has been achieved by a method for operating a high speed uplink base station, comprising at least one downlink control channel (E-AGCH) on which mobile user entities are scheduled to receive absolute grants, the downlink control channel being arranged into transmission intervals corresponding to a first interval (P1) or a second interval (P2), the possible start of a first transmission interval (P1) being defined by a period corresponding to an integer number multiplied by the duration of the first transmission interval from a predefined (t1) frame on an additional control channel (P-CCPCH), the possible start of a second transmission interval (P2) being defined by a period corresponding to an integer number multiplied by the duration of the second transmission interval (P2) from the predefined (t1) frame on an additional control channel (P-CCPCH), wherein the base station is adapted to communicate with first type user entities (UE1) exclusively being able to communicate in the first transmission intervals (P1) and with second type user entities (UE2) being able to communicate in the second transmission intervals (P2).

The method moreover comprising the steps of
arranging or re-arranging (ii; 11ii-16ii., 27ii) a first downlink control channel having transmission intervals of exclusively the first interval (10 ms) and arranging or rearranging a second downlink control channel having transmission intervals of exclusively the second interval (2 ms);
assigning or re-assigning user entities to respective arranged downlink control channels (v), while
scheduling (x) traffic for assigned user entities.

According to a further aspect the method comprises the further step of cooperating in configuring or re-configuring (i, 10i) downlink control channels, whereby downlink control channels are added or deleted for the base station.

It is a second object of the invention to facilitate an alternative economic channel resource assignment in a HSUPA base station, in particular an efficient utilization of shared downlink control resources.

This further object has been achieved by a method for operating a high speed uplink base station, comprising at least one downlink control channel (E-AGCH) on which mobile user entities are scheduled to receive absolute grants, the downlink control channel being arranged into transmission intervals corresponding to a first interval (P1) or a second interval (P2), the possible start of a first transmission interval (P1) being defined by a period corresponding to an integer number multiplied by the duration of the first transmission interval from a predefined (t1) frame on an additional control channel (P-CCPCH), the possible start of a second transmission interval (P2) being defined by a period corresponding to an integer number multiplied by the duration of the second transmission interval (P2) from the predefined (t1) frame on the additional control channel (P-CCPCH), wherein the base station is adapted to communicate with first type user entities (UE1) exclusively being able to communicate in the first transmission intervals (P1) and with second type user entities (UE2) being able to communicate in the second transmission intervals (P2).

The method comprising the steps of
calculating the load on each configured channel (iii);
assigning (vi) or re-assigning user entities to respective arranged downlink control channels (vi), while
scheduling (x) traffic for assigned user entities on at least a given channel having transmission intervals of the first interval (P1) and/or the second interval (P2), whereby the proportion of first intervals (P1) to second interval (P2) varies dynamically.

Advantageously, the method comprises the further step of co-operating in configuring or re-configuring (i, 10i) downlink control channels, whereby downlink control channels are added to or deleted from the base station.

According to further aspects of the invention, the downlink control channels are Enhanced Absolute Grant channels (E-AGCH).

Downlink (DL) capacity in a WCDMA (Wideband Code Division Multiplex Access) cell is typically power and/or code limited. Therefore it is of interest to use as few channelization codes as possible. The less serving radio links, also denoted channels, in the cell, the less channelization codes are needed to transmit the absolute grants, via E-AGCH. Hence, the invention limits the configured codes based on number of serving radio links in the cell.

Further advantages will be apparent from the following detailed description of the invention.

BRIEF DESCRIPTION OF THE DRAWINGS

FIG. 1 shows basic elements of a prior art HSUPA network,
FIG. 2 shows an excerpt of the release 6, HSUPA specification concerning timing properties for the E-AGCH channel using either 10 or 2 ms TTI,
FIG. 3 shows a possible prior art scenario for mixed TTI mode transmissions using two E-AGCH channels,
FIG. 19 shows a scheduling scenario according to the second embodiment.

DETAILED DESCRIPTION OF PREFERRED EMBODIMENTS OF THE INVENTION

1st Embodiment of the Invention

Figure 9:
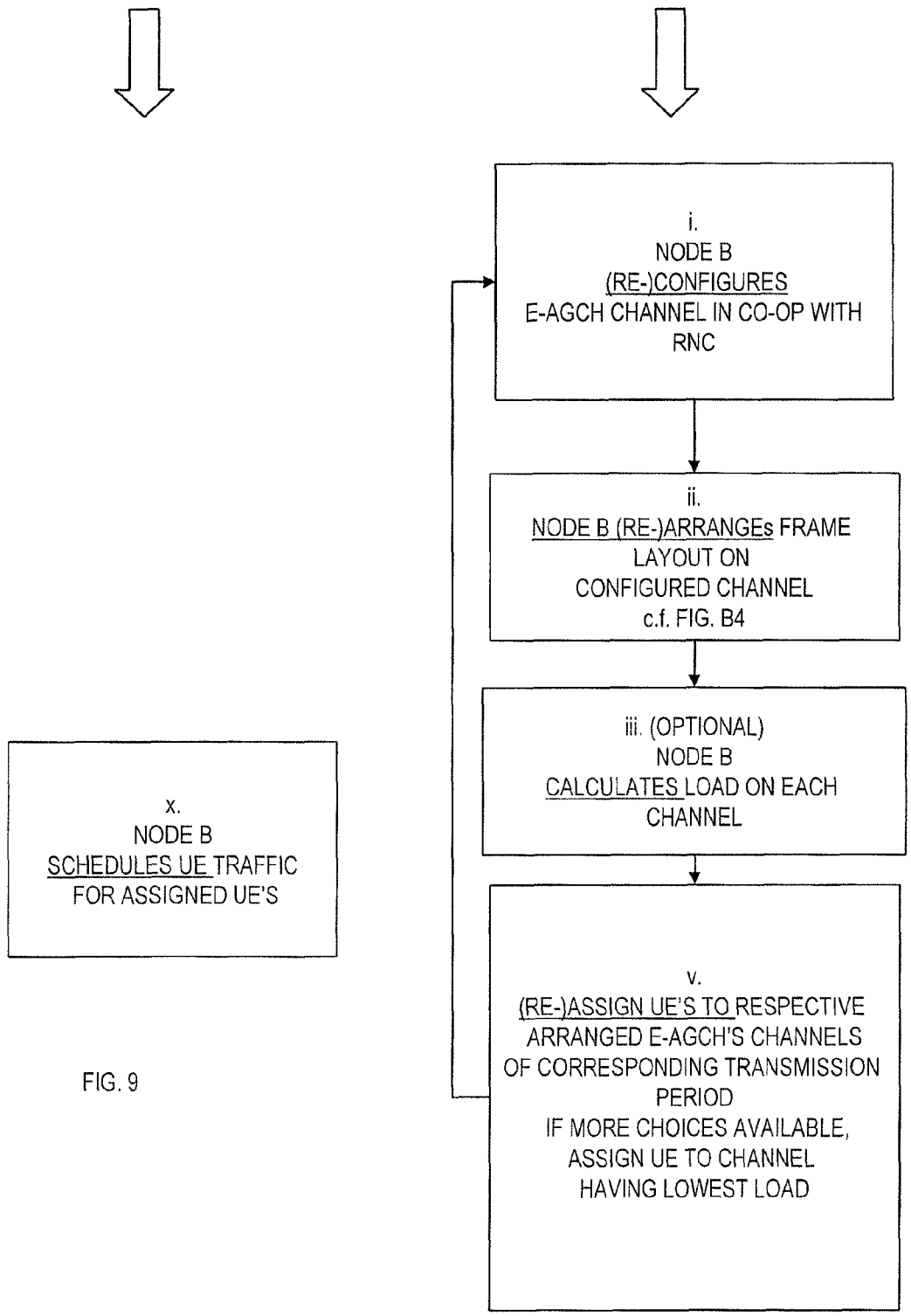
FIG. 9 shows a first embodiment of a routine for E-AGCH channel configuration, E-AGCH channel arrangement and, UE to RL assignment and scheduling according to the invention.

FIG. 9 pertains to the general procedure running in Node B for E-AGCH configuration, channel arrangement, UE to E-AGCH code assignment and UE scheduling.

There is shown a method for operating a high speed uplink base station, comprising at least one downlink control channel (E-AGCH) on which mobile user entities are scheduled to receive absolute grants, the downlink control channel being arranged into transmission intervals corresponding to a first interval (P1) or a second interval (P2), the possible start of a first transmission interval (P1) being defined by a period corresponding to an integer number multiplied by the duration of the first transmission interval from a predefined (t1) frame on an additional control channel (P-CCPCH), the possible start of a second transmission interval (P2) being defined by a period corresponding to an integer number multiplied by the duration of the second transmission interval (P2) from the predefined (t1) frame on an additional control channel (P-CCPCH), wherein the base station is adapted to communicate with first type user entities (UE1) exclusively being able to communicate in the first transmission intervals (P1) and with second type user entities (UE2) being able to communicate in the second transmission intervals (P2). The method comprising the steps of arranging or re-arranging (ii; 11ii-16ii., 26ii, 27ii) a first downlink control channel having transmission intervals of exclusively the first interval (10 ms) and arranging or rearranging a second downlink control channel having transmission intervals of exclusively the second interval (2 ms);

assigning or re-assigning user entities to respective arranged downlink control channels (v), while scheduling (x) traffic for assigned user entities.

The description of the latter step x) of UE scheduling x) can be performed in numerous known ways. According to the invention, the scheduling of packets on respective TTI slots take place according to given scheduling routines, but only on the channel to which the UE is assigned, v).

The method moreover advantageously comprises the following step which however does not need to be carried out as often as the step of assigning user entities:

configuring or re-configuring (i, 10i) downlink control channels, whereby E-AGCH downlink control channels are added or deleted for the base station.

Node B performs a specific arrangement ii) of time slots on respective E-AGCH channelization codes in such a manner that e.g. a first respective E-AGCH channelization code is arranged having exclusively 10 ms TTI intervals P1 and a second respective E-AGCH channelization code has exclusively 2 ms intervals P2.

In other words, at least some channelization codes used according to the channel arrangement according to the first embodiment of the invention are such that an arranged E-AGCH channel does not comprise a combination of 2 ms and 10 ms intervals. The manner of arranging the E-AGCH channel shall in the following be referred to as a "clean" TTI channel arrangement, an E-AGCH having such an arrangement being denoted a "clean" E-AGCH channel.

According to one aspect of this embodiment, UE's capable of performing a 2 ms TTI interval are preferably scheduled either on a clean E-AGCH channel having 2 ms TTI's or on the clean E-AGCH channel having 10 ms TTI's, since the 2 ms TTI type user entity are also capable of handling the 10 ms TTI.

Figure 7:
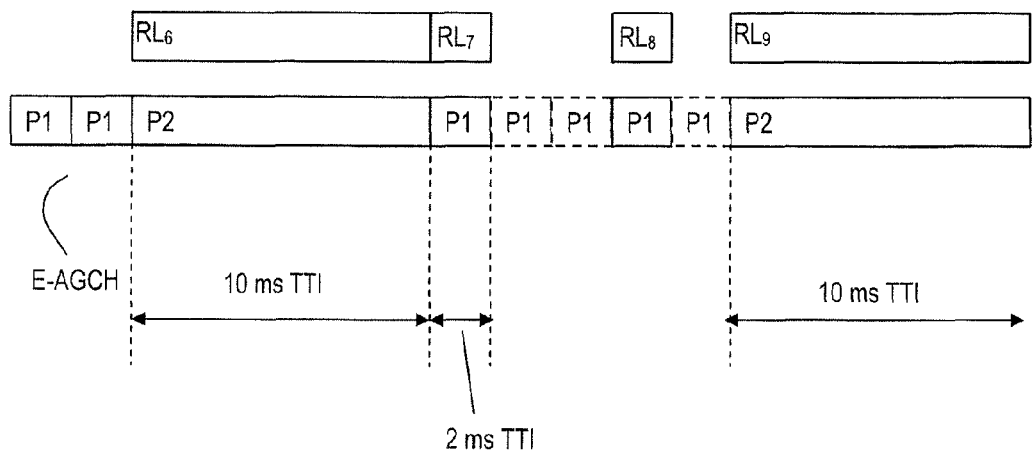
FIG. 7 shows a further scenario for mixed TTI mode transmissions using two E-AGCH channels according to preferred embodiments of the invention.
Figure 8:
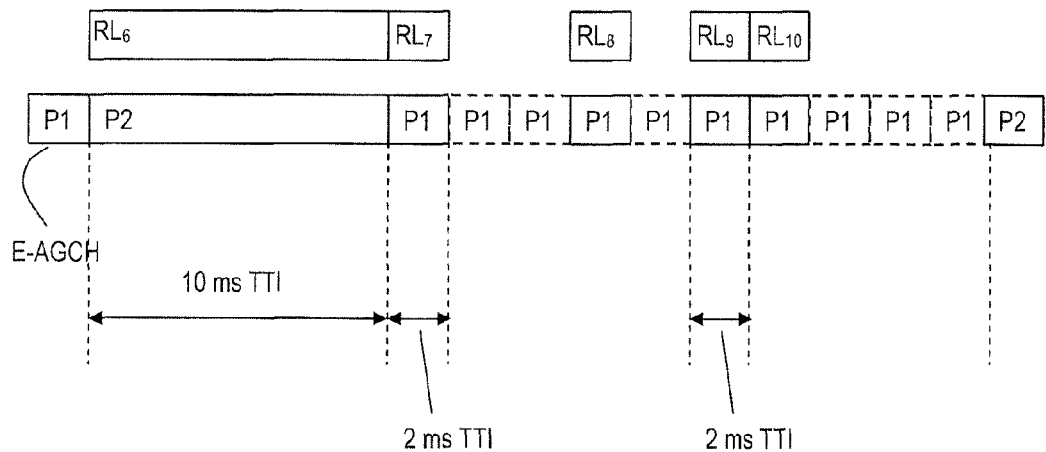
FIG. 8 shows timing properties in relation to FIG. 7.

Another way of arranging the E-AGCH channels are shown in FIGS. 7 and 8 where the 10 ms TTI interval are interrupted by 2 ms TTI intervals in a time multiplexed fashion. According to the invention these interruptions may be periodic or subject to a dynamic allocation whereby the ratio of 10 ms intervals to 2 ms intervals varies. This channel arrangement shall be referred to as a "mixed" channel arrangement, an E-AGCH channel having such an arrangement being a "mixed" E-AGCH channel.

Figure 10:
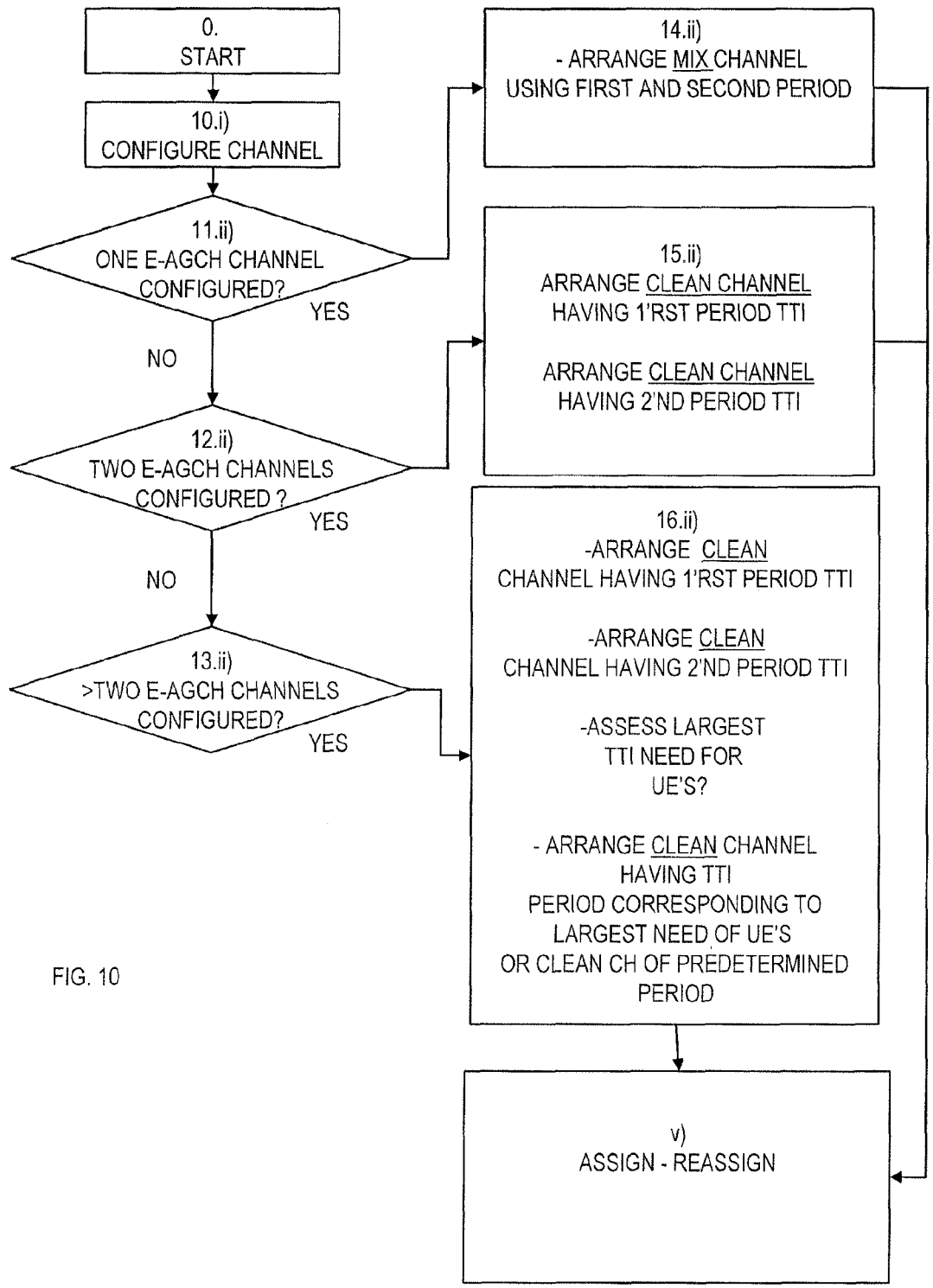
FIG. 10 shows an alternative to the first embodiment.

In FIG. 10, a routine is provided, running in Node B, further elucidating the E-AGCH channel configuration (i), channel arrangement (ii) and radio link to UE assignment (v) shown in FIG. 9 with regard to how a start-up situation is performed is further elucidated. It should be understood that step x) is also performed.

In steps 11ii, 12ii and 13ii, it is examined whether one, two or several E-AGCH channels are configured according to the NBAP protocol.

If only one channel is allocated, step 11ii, there is of course no choice and Node B decides that all UE's have to share the given E-AGCH channel code, step 14ii. Subsequently, UE's are assigned to the channel, v. For this reason, the E-AGCH channel is arranged in a predetermined "mixed" pattern of 2 ms and 10 ms TTI's of a layout as shown in FIGS. 7 and 8.

If two channels are available, step 12ii, the routine proceeds to step 15ii, wherein one channel is arranged only with 10 ms TTI's and the other channel is arranged with only 2 ms TTI's, i.e. both channels being clean channels.

According to a first aspect of the first embodiment, first interval TTI type UE's are scheduled on the former 10 ms E-AGCH channel and the second interval TTI type UE's are preferably scheduled on the latter 2 ms channel, to the extent that resources are not being exempt on the 2 ms channel while the 10 ms channel has free slots. It is noted that a 2 ms UE which is configured as a "10 ms" UE, de facto is considered to be a 10 ms UE in this context.

If more than two E-AGCH channels are available, as found under step 13*ii*, one option—step 16*ii*—is to arrange at least a first clean channel having 10 ms TTI's and at least a second clean channel having only 2 ms TTI's. Any further configured E-AGCH channel is selectively arranged as a clean channel, either according to the largest need of the UE's or according to a predetermined transmission interval.

According to one aspect of the first embodiment, the need for TTI intervals of a specific length, and hence the need for an additional clean channel of a given TTI interval, is assessed. The type of interval for a clean channel for which type there is the largest need can also be expressed as the interval type of a configured channel having the lowest capacity, as calculated in the optional step iii of FIG. 9.

The method may be arranged such that when more than two E-AGCH channelization codes, 13*ii*, the TTI interval arrangement of the additional clean channel is selected according to the type for which the need is largest.

There may be a larger need to use the additional code for 10 ms TTI, since there is five times less transmission occasions on a clean 10 ms TTI channel compared to a clean 2 ms TTI channel (note with same amount of UE's using 2 ms TTI as 10 ms TTI, the third code will typically be allocated to 10 ms TTI usage, since there is less transmission occasions for 10 ms TTI). However, if there are five times or more 2 ms TTI serving RL's, then there is a larger need for 2 ms TTI transmissions.

Whether an additional 3rd, 4th, 5th E-AGCH code shall be arranged for 2 ms TTI usage or not can be based on the capacity for each TTI type.

Total_Capacity2 ms=5*"Number of Configured E-AGCH codes"2 ms*1/("Number of serving RL's" 2 ms)

Total_Capacity10 ms=1*"Number of Configured E-AGCH codes"10 ms*1/("Number of serving RL's" 10 ms)

Each time there is an empty 3rd or 4th or $5^{th}$ E-AGCH code, it is arranged as a clean channel with a TTI interval corresponding to the existing channels of a given "TTI type" with the lowest capacity. The lowest capacity for a given type of clean channel can also be expressed as the largest need for a given type of clean channel.

The above calculation is carried out under step iii) in FIG. 9.

Subsequently, in step v, UE's are assigned to a channel of corresponding TTI interval. With a configuration of one E-AGCH channelization codes arranged as 10 ms TTI and two E-AGCH channelization arranged as 2 ms TTI ms code in one cell, the Node B configures all UE's with 2 ms TTI's on the two 2 ms channelization code and all UE's with 10 ms TTI's on the other.

It is shown that for FIG. 10, if one downlink control channel code is configured (110, the downlink control channel is arranged as a mixed channel having both the first (P1) and second interval (P2) (14*ii*); if two downlink control channel codes are configured (12*ii*), the downlink control channel are arranged as clean channels, that is, each respective channel having exclusively intervals of the first interval (P1) or the second interval (P2), one downlink control channel having the first interval (P1), the second downlink control channel having the second interval (P2) (15*ii*).

If at least two downlink control channels (15*ii*) are configured, the step of assigning v) involves assigning or re-assigning (v) UE's exclusively capable of using the first interval (P1)—first interval UE's—to the first, clean, downlink control channel; and assigning or re-assigning (v) UE's capable of using at least the second interval (P2)—second interval type UE's—to the second, clean, downlink control channel.

If more than two downlink control channels are configured, at least a first and a second downlink control channel are arranging (16*ii*) as clean channels, the first downlink control channel having a first transmission interval (P1, P2) the second downlink control channel having a second transmission interval and a third downlink control channel having either the first or the second transmission interval, this interval for example being predetermined (P1, P2).

Second Alternative of First Embodiment

Figure 11:
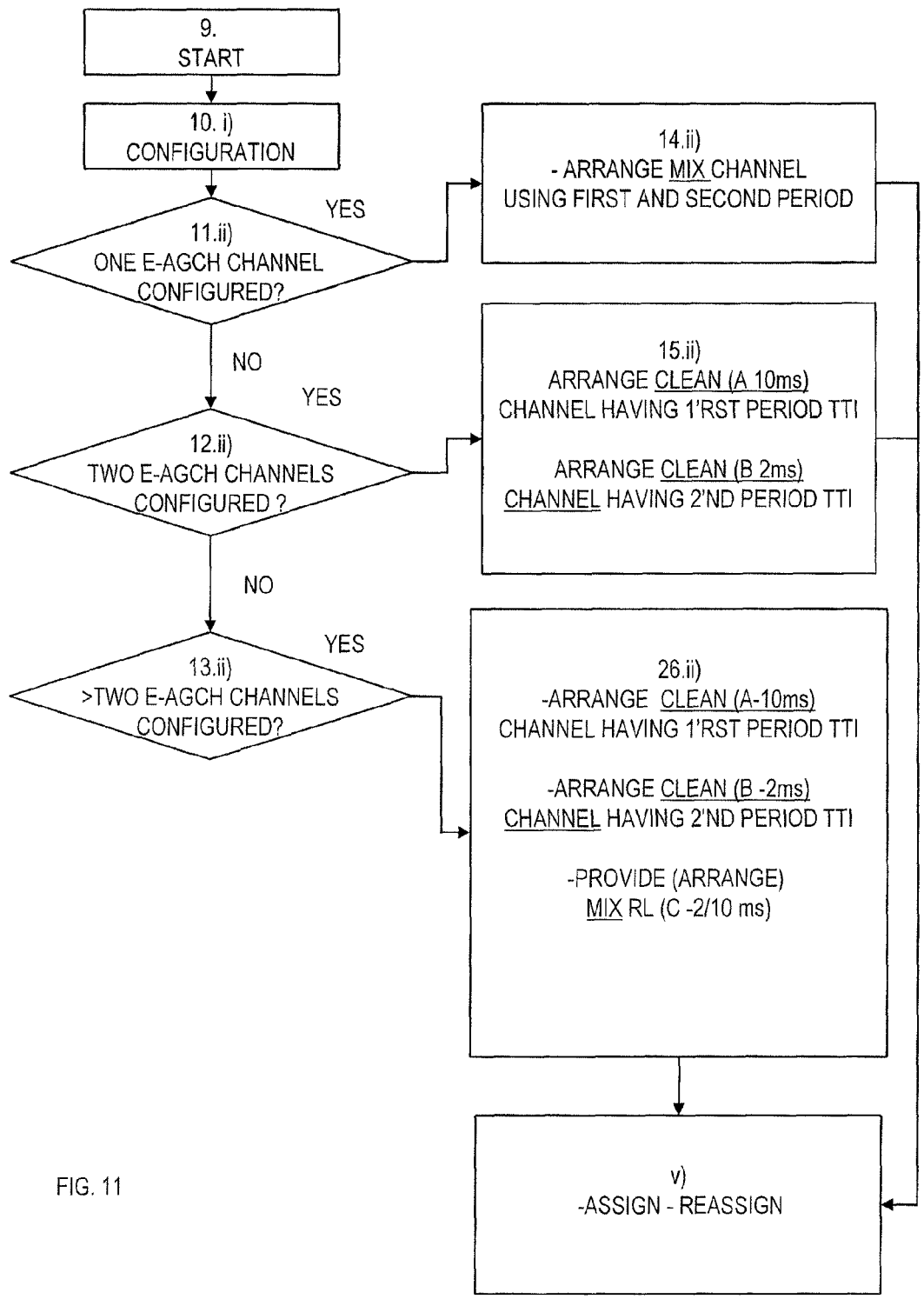
FIG. 11 shows a second alternative of the first embodiment according to the invention.

In FIG. 11, another alternative is shown. This embodiment is similar to the procedure shown in FIG. 10, but step 16*ii* is arranged for in a different manner and are replaced by step 26*ii*. Reference is furthermore made to FIG. 9.

As in the first embodiment, there is at least a first clean channel having 10 ms TTI and a second clean channel having 2 ms TTI's. The UE allocation to those channels is as mentioned above.

If more than two E-AGCH channels are available, step 13*ii*,—and a number of these channels are actually under operation—the TTI frame arrangement, step 26, of any further newly configured E-AGCH channel, is a mix channel arrangement.

In FIGS. 7 and 8, examples of a mix type E-AGCH channel arrangement are shown. The actual distribution of 10 ms TTI intervals to 2 ms TTI intervals may be predetermined and based on empirical values.

Once the additional channel is arranged, further appearing UE's are assigned to the—in this example—three channels according to a load distribution mechanism which substantially corresponds to a mechanism which shall be explained later in the following with respect to FIG. 19.

The load distribution mechanism is preferably, among others, relying on a weight parameter associated with at least the second interval-type UE's. The cumulative load of each channel is kept track of, whereby every time an incoming UE is appearing in the cell and subsequently assigned to a channel, the load is updated for the channel to which the UE was assigned. According to a first aspect of the first embodiment, second interval type UE's has an incremental load value of 1, whereas first interval type UE's has an incremental load value of 5. Other specific incremental load values may apply.

Using this mechanism, an even distribution of the UE's is secured such that channel resources are used efficiently and such that the quality of service can be rendered consistent for UE's of different types. This is true, at least under the assumption that UE's are equally active.

As shown in FIG. 11, if more than two downlink control channels are configured, arranging at least a third downlink control channel may be arranged as a mix channel (26*ii*).

Figure 12:
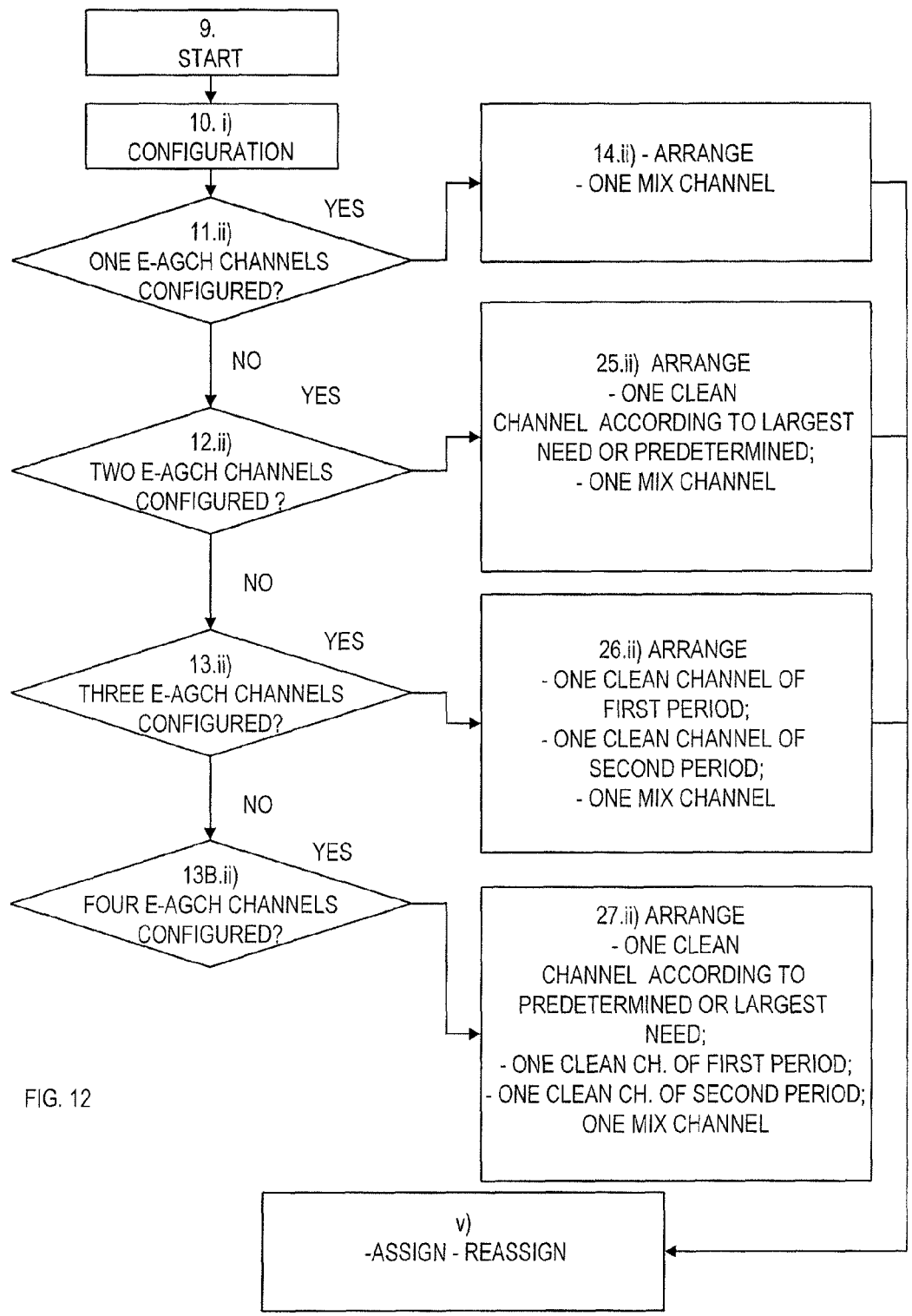
FIG. 12 shows a third alternative of the first embodiment.

In FIG. 12, a third alternative of the first embodiment is described.

In this alternative embodiment, if two downlink control channels are configured, arranging one clean channel according to the transmission interval (P1, P2) of the largest need and arrange the other downlink control channel code as a mixed channel having both the first and second interval (P1, P2) (25*ii*);

If four downlink control channels are configured, there is arranged at least one clean channel according to the transmission interval (P1, P2) of the largest need; one clean channel of first interval (P1); one clean channel of second interval (P2) and one mix channel (27*ii*)

If traffic demand is such that more than two downlink control channels are configured (13), the method comprises the further steps of arranging (26ii) the third downlink control channel as a mix channel having first transmission intervals (P1) interrupted by second transmission interval's (P2);

at least assigning (v) a number of first type user entities (UE1) to the first downlink control channel and at least assigning a second number of second type user entities (UE2) to the second downlink control channel, while at least assigning a third number of first type user entity (UE1) to first transmission intervals of the third downlink control channel and a fourth number of second type user entity (UE2) to the second transmission intervals of the third downlink control channel.

For aspects of the first embodiment it applies that the scheduling (x) is performed more often than the steps of configuring (i) and assigning (vi).

It also applies that when the method additionally comprising the step of calculating the load (iii) on all configured downlink control channels, that If more downlink control channels are available for a user entity (UE1, UE2) being capable of a given transmission interval (P1, P2), a user entity may be assigned to the downlink control channel comprising the given transmission interval—which the user entity is capable of transmitting on—having the lowest load.

It is noted that the load may be calculated to correspond to the number of assigned user entities to a given downlink control channel.

2'nd Embodiment

Dynamic Load Calculation

Figure 13:
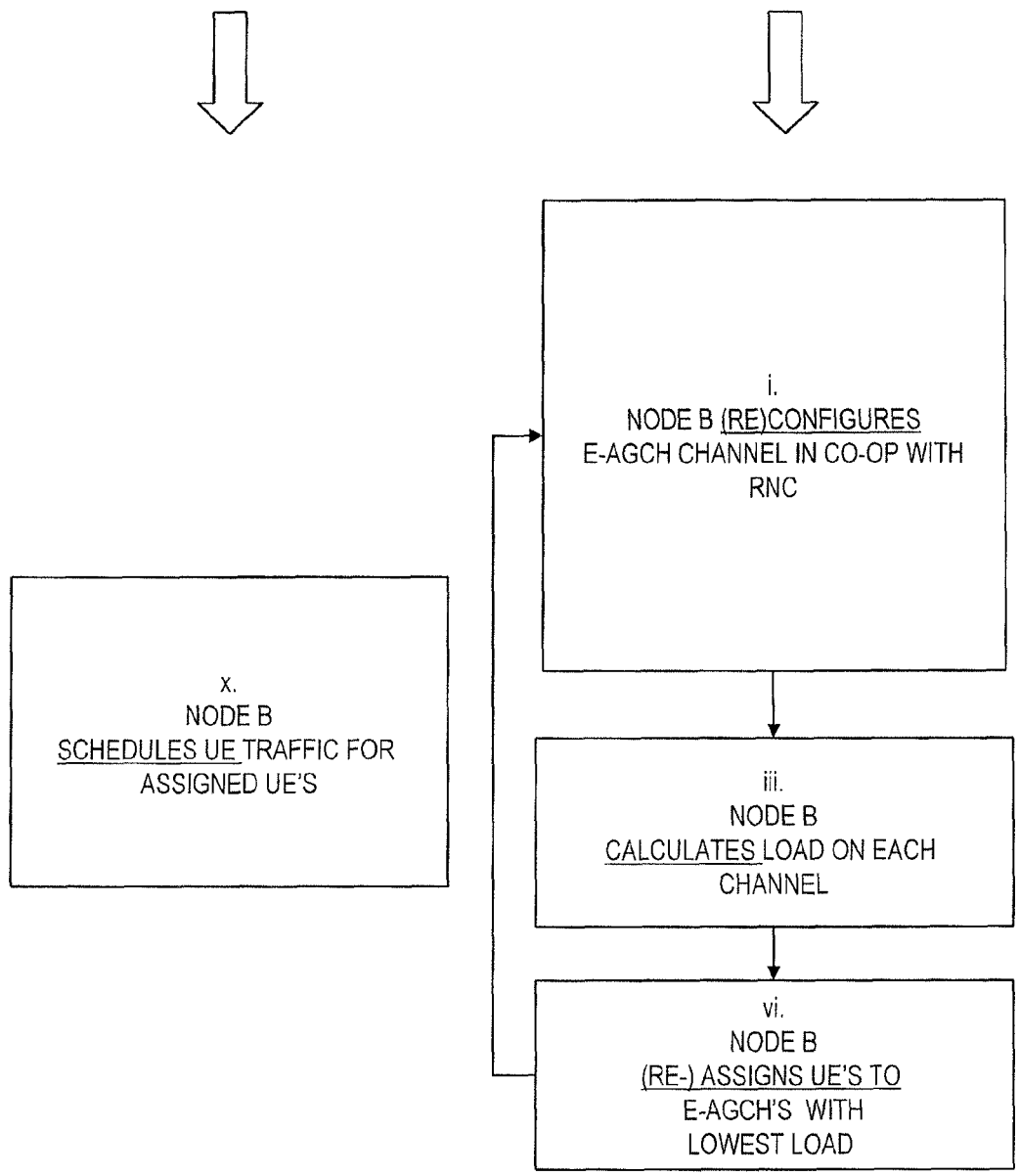
FIG. 13 shows a second embodiment of a routine for E-AGCH channel configuration, UE to RL assignment and scheduling according to the invention.

In FIG. 13, another Node B procedure is shown wherein:

The method is for operating a high speed uplink base station, comprising at least one downlink control channel (E-AGCH) on which mobile user entities are scheduled to receive absolute grants, the downlink control channel being arranged into transmission intervals corresponding to a first interval (P1) or a second interval (P2), the possible start of a first transmission interval (P1) being defined by a period corresponding to an integer number times the duration of the first transmission interval from a predefined (t1) frame on an additional control channel (P-CCPCH), the possible start of a second transmission interval (P2) being defined by a period corresponding to an integer number times the duration of the second transmission interval (P2) from the predefined (t1) frame on the additional control channel (P-CCPCH), wherein the base station is adapted to communicate with first type user entities (UE1) exclusively being able to communicate in the first transmission intervals (P1) and with second type user entities (UE2) being able to communicate in the second transmission intervals (P2). The method comprises the steps of calculating the load on each configured channel (iii);

assigning (vi) or re-assigning user entities to respective arranged downlink control channels (vi), while scheduling (x) traffic for assigned user entities on at least a given channel having transmission intervals of the first interval (P1) and/or the second interval (P2), whereby the proportion of first intervals (P1) to second interval (P2) varies dynamically.

Advantageously, the method moreover comprises the further step of cooperating in a configuring or re-configuring (i, 10i) of downlink control channels, whereby downlink control channels are added or deleted for the base station.

The second embodiment makes use of the flexible predominantly mix channel arrangement shown in FIG. 7 or 8, although the step of "arranging the layout" in a given step before scheduling is carried out is not undertaken, in contrast to the first embodiment. The channel arrangement of each E-AGCH according to the second embodiment is not necessary constant over time, since the actual scheduling decisions effect how the "channel arrangement" or channel lay-out is defined over time.

In FIG. 19, an example of the second embodiment is shown, wherein a calculation and assignment mechanism corresponding to steps iii and vi of FIG. 13 is shown. The load on a first E-AGCH channel A and the load on a second channel B is depicted as new UE's of different TTI types are assigned to or leaving from the respective channels A/B. The UE's are assigned to the channels according to the accumulated load on those channels.

The key C1 indicates that a respective channel, A or B, appears as a clean channel having 10 ms TTI's, while key C2 indicates that it appears as a clean 2 ms TTI sub-frame structure, as appearing by the result of the scheduling for the respective channel. M indicates that channels A or B appear as mix channels, for the time being.

It appears that the downlink control channel is scheduled such that the frame layout may be scheduled during a period such that the downlink control channel only includes the first interval (P1), the downlink control channel only includes the second interval (P2); or the downlink control channel being scheduled such that it includes a mix of the first and second interval.

It is moreover the case that the proportion of first intervals (P1) to second interval (P2) is scheduled so that the proportion varies dynamically.

One first alternative of the assignment step iii) is performed in such a manner that a weighting factor of 1 applies for 2 ms UE's while 10 ms TTI type UE's are associated with a weighting factor of 5.

According to step vi) UE's are assigned to E-AGCH's having the lowest momentary load.

When a UE leaves the channel in a given cell of the Node B, a value with the corresponding weighting factor is deduced from the accumulated load value pertaining to the given respective channels. Incoming UE' are shown with positive numbers, while leaving UE's are associated with a negative sign in FIG. 19.

As mentioned above, it should be understood that a substantially corresponding assignment mechanism described under the second embodiment, may also be used for ii, and v). of the FIG. 9 embodiment for mix channels. It may also be used for more E-AGCH channels than two and that the mechanism is not only applicable to channel arrangements comprising hybrids of mix and clean channels, but also to clean channels only and to only mix channels explained under the first embodiment. In these cases the mechanism is modified so that user entities are only assigned to channels for which they are capable of receiving absolute grants.

2nd Embodiment

Alternative Incremental Load Value Calculation

The load calculation step iii) for the second embodiment can be calculated in various ways according to the invention.

By example, a wireless end user having a HSDPA & EUL capable laptop device is thought of. One could assume that when comparing the end user behavior if the EUL part is capable of 2 ms against the same user with 10 ms that the user tends to download more information having the 2 ms TTI. The time from "clicking a web page", waiting for the page to be completely downloaded, until the "next click" will come can be shortened. Consequently, one could assume that a 2 ms user will require more signaling upon the E-AGCH channel. According to an alternative, the load calculation formula is modified by adding further weighting factor to compensate for this expected behavior, which also can be established empirically Alternatively, the load is calculated by dynamically counting the usage of the E-AGCH comparing it against the maximum capability. The usage could be calculated e.g. by a sliding window over the last second, calculating the usage of each E-AGCH compared to the maximum capability of each E-AGCH. The lowest load will in this case appear for the E-AGCH channel with the lowest usage compared to a maximum usage.

Figure 14:
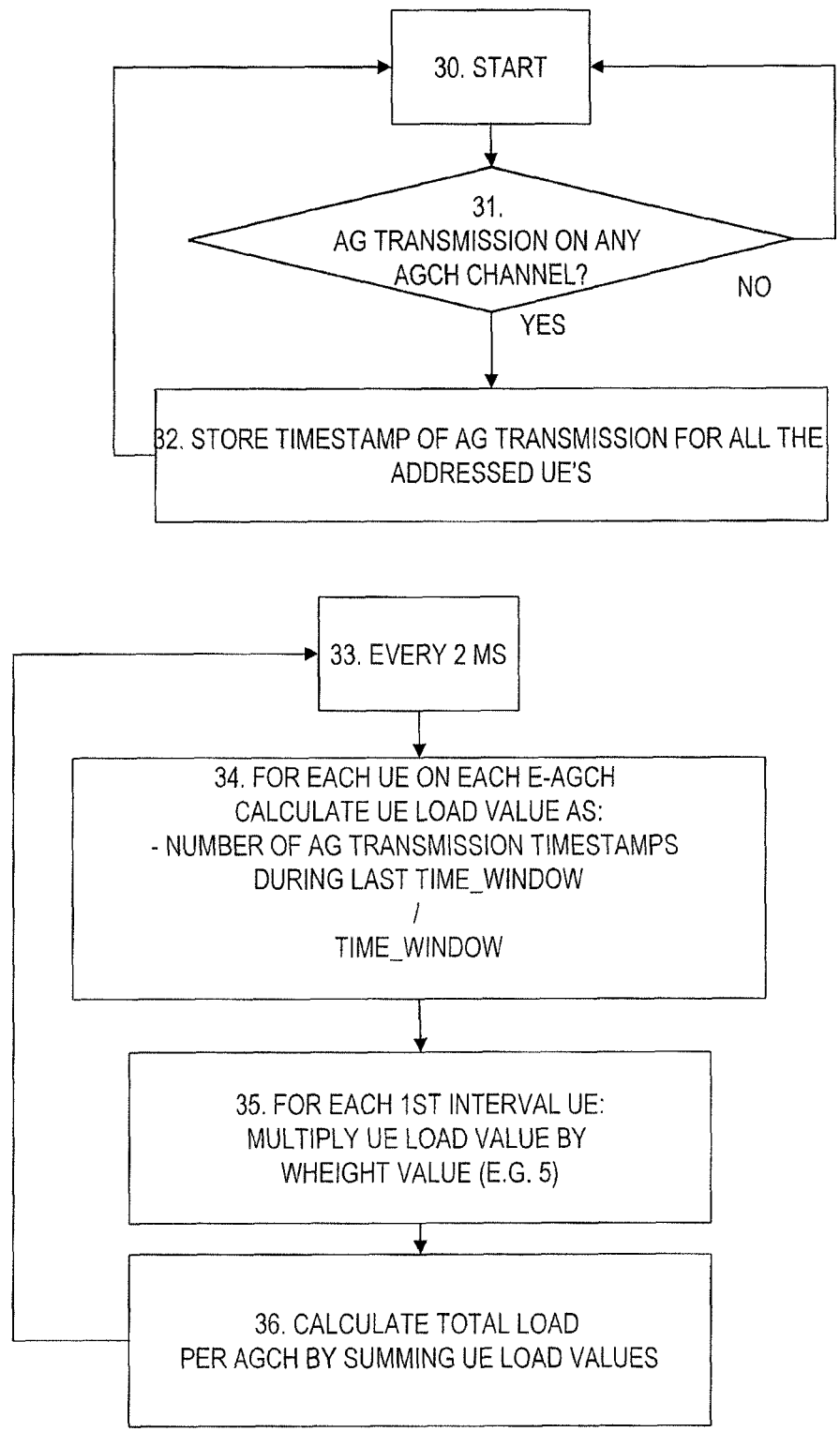
FIG. 14 shows a dynamic load value calculation routine optionally forming part of the second embodiment.

The procedure is shown in FIG. 14: In step 30 the routine starts; in 31 it is determined whether absolute grant transmissions are transmitted from the serving node on any E-AGCH channel; in 32, if this is the case, a timestamp is stored of absolute grant transmissions for all the addressed user entities.

Parallel with the above steps, in step 33 for every 2 ms, by example, 34 for each user entity on each E-AGCH channel, a user entity load value corresponding to the ratio of the number of absolute grant transmission timestamps during a last time window to the time window extension is calculated. In step 35, for each 2 ms (P2) type user entity, the user entity load value is multiplied by a weight value, e.g. by 5, in line with the procedure explained above. In step 36, the total load value per E-AGCH channel is calculated by summing up the load values of assigned user entities for each downlink control channel.

The load on each configured channel is calculated, by using a user entity value for each user entity according to the amount of absolute grants (34) being transmitted for that particular user entity within a moving time window (30-32).

Moreover, the user entity load value (35) may be compensated with a weight value for user entities capable of using the second interval, the weight value being larger than one.

Figure 15:
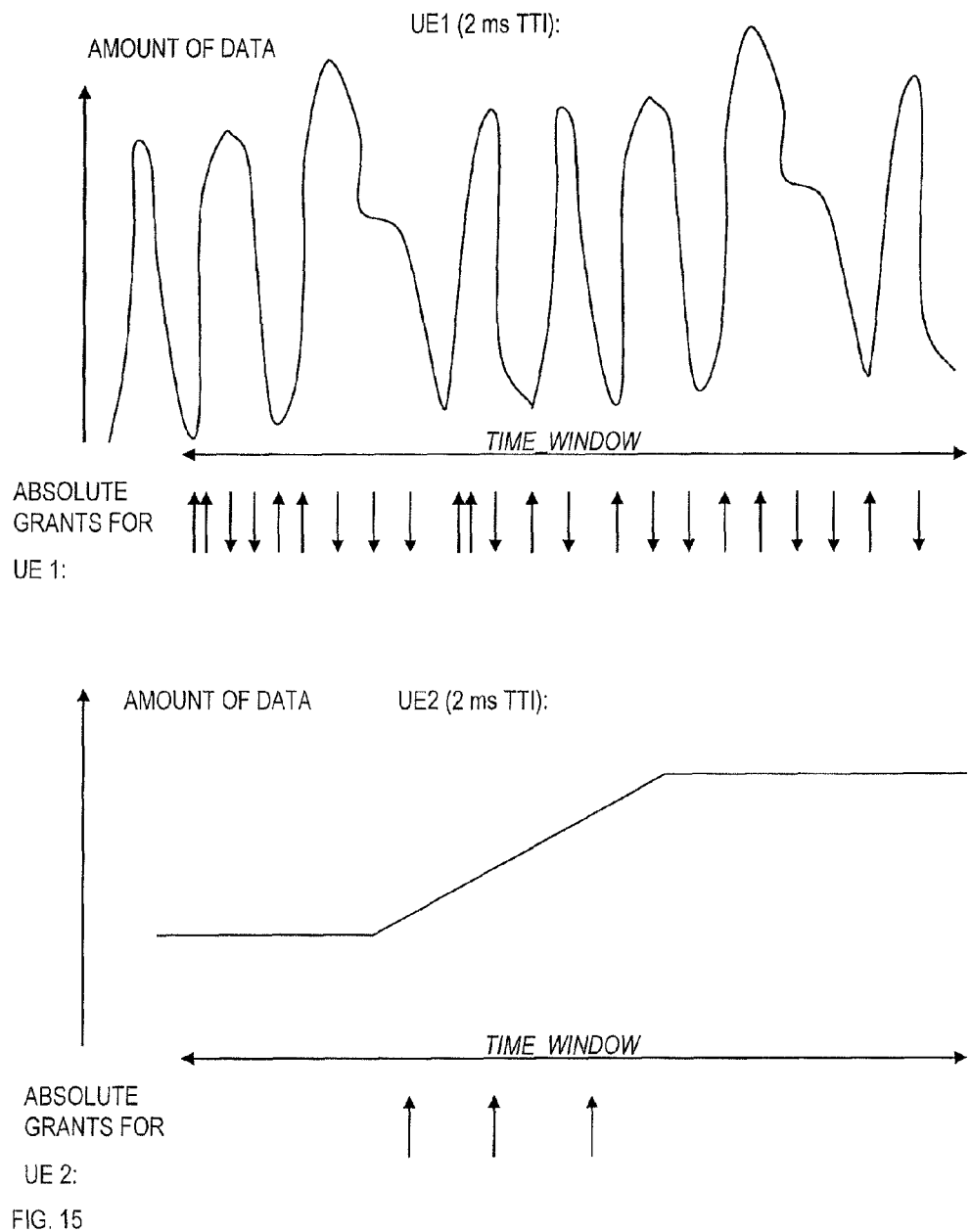
FIG. 15 shows aspects of the second embodiment.

FIG. 15 shows an example of a user entity with bursty transmission (UE1) and a UE with mainly fixed rate UE2. The arrows exemplifying the E-AGCH transmissions show that an absolute grant rate change has occurred for the E-AGCH channel to which the user entity is assigned. The direction of the arrows shows increase or decrease of granted transmission capacity.

Based on FIG. 15, user entity UE 1 has a load ratio which is 23/time_window, while user entity UE 2 has load ratio 3/time_window. This shows that since user entity UE1 is associated with a bursty traffic pattern, it causes a higher load on the E-AGCH channel to which it is assigned compared to the load of user entity UE2 for its respective channel. The bursty UE1 takes up more capacity on the E-AGCH channel than the more constant UE2, despite UE2 at least in a final phase transmits more data.

The load of all UEs assigned to specific E-AGCH codes are summed up. This is performed for all E-AGCH codes in the cell. According to this alternative of the second embodiment, a new user entity entering the system is assigned to the E-AGCH code with lowest load.

According to the second embodiment, it is provided that the scheduling (x) is performed more often than the step of assigning (vi).

The load on each configured channel may be calculated, by calculating a load value for each user entity assigned to the channel (34); and the load on a given downlink control channel is calculated as a cumulative load value for a given channel after a user entity has been assigned to or has left the given channel. Incoming user entities being assigned on the channel having the lowest load (vi).

Alternatively the load on each configured channel is calculated, by using a user entity value for each user entity according to the amount of absolute grants (34) being transmitted for that particular user entity within a moving time window (30-32).

The user entity value (35) may be compensated with a weight value for user entities capable of using the second interval, the weight value being larger than one.

The downlink control channel is scheduled such that the frame layout may be scheduled during a period such that the downlink control channel only includes the first interval (P1), the downlink control channel only includes the second interval (P2); or the downlink control channel being scheduled such that it includes a mix of the first and second interval.

It is noted that the proportion of first intervals (P1) to second interval (P2) is scheduled so that the proportion varies dynamically.

1st and 2nd Embodiment

Channel Configuration

In the following, an explanation is given as to how Node B in co-operation with the RNC, configures E-AGCH channels as shown under steps i) of fig A11 and A12, hence pertaining to both embodiments described above.

Figure 16:
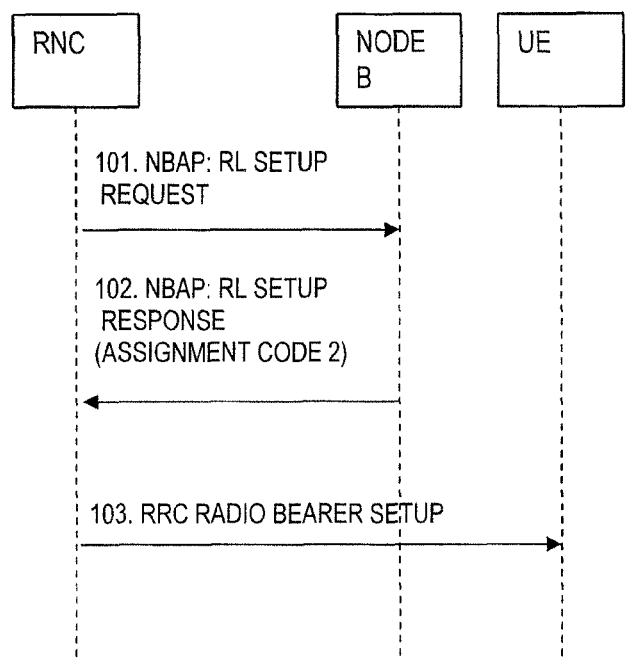
FIG. 16 shows an example of user entity to channel assignment according to the second embodiment according to the NBAP protocol.

For instance, upon a UE requesting the HSUPA service, the channelization code is signaled in the RL SETUP or RL RECONFIGURATION messages from Node B to RNC, which is then forwarded via the RRC protocol to the UE. Subsequently, traffic can be scheduled on the given channel to which the UE is assigned In FIG. 16, known steps according to the NBAP protocol is shown which are utilized according to the invention. The RNC informs Node B of a RL Setup request 101 (stemming from the user entity (UE). Node B transmits the RL setup response 102, including the radio link assignment (v, vi), that is, the E-AGCH code assignment to the given user entity (UE), which code allocation is informed to the user entity in the RRC radio bearer setup message 103. Thereby a given UE is allocated to a given E-AGCH channel.

Figure 17:
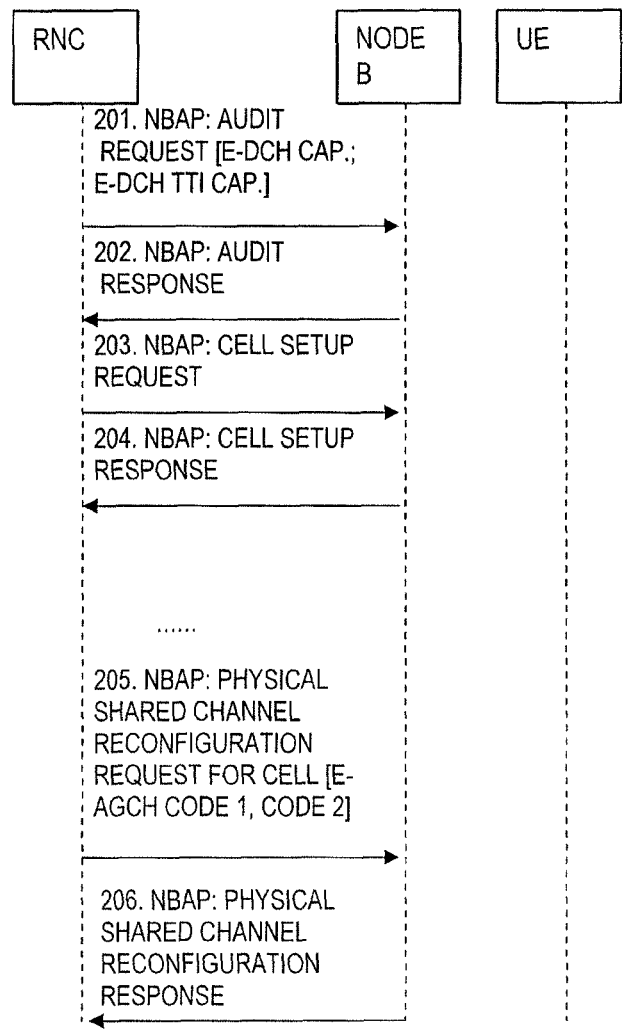
FIG. 17 shows channel configuration acc. to NBAP protocol.

In FIG. 17, the process of the RNC initiating channel configuration (i) for the cell is illustrated. In step 201 an audit request signal is issued. Node B signals an Audit Response signal. In step 203, a Cell Setup request signal is issued, which is echoed in a Cell Setup Response message from Node B, 204. Following this signaling, Node B is allowed to use an E-AGCH channel, which is offered to Node B by the RNC in a Physical Shared Channel Re-configuration Request for the cell associated with Node B, 205. Node B subsequently signals the acceptance in a Physical Shared Channel re-configuration response 206.

Figure 18:
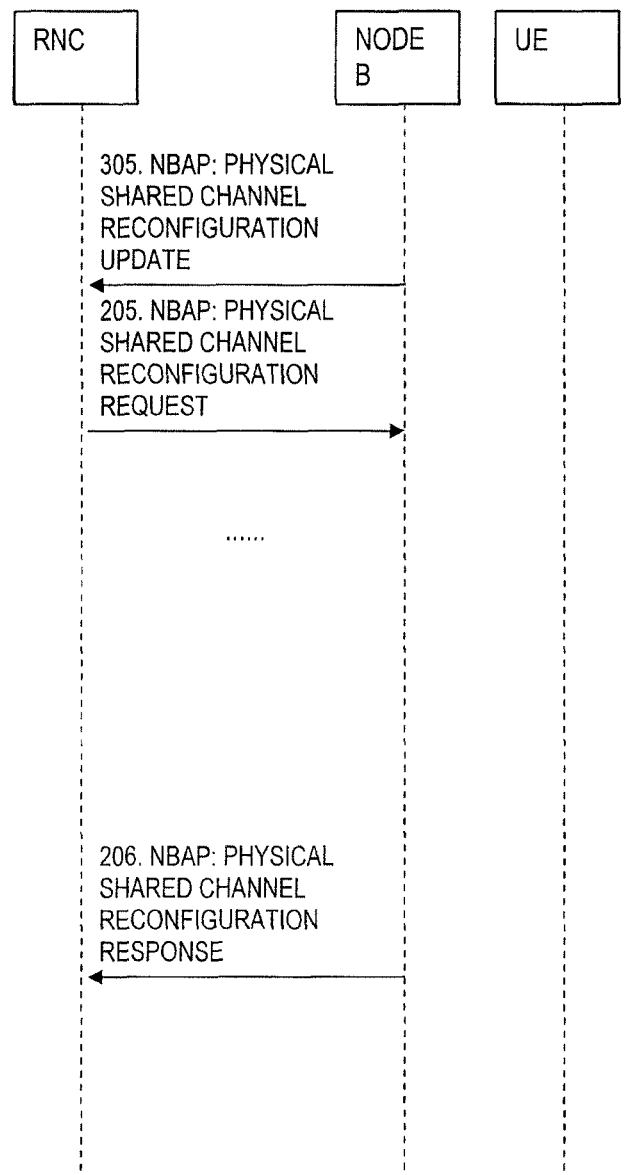
FIG. 18 shows a channel re-configuration according to the invention using NBAP.

In FIG. 18, a new procedure according to the invention is shown, having steps 305, 205-206 in which Node B initially request a re-configuration initiation 305 of an E-AGCH channel, that is having an E-AGCH configured so that it can be used by Node B or having a channel removed for use by Node B. The invention makes use of a the new signal, shown in 305, denoted e.g. physical shared channel reconfiguration "update", which comprises information as to the cell ID of Node B making the re-configuration initiation signal 305 and as to how many E-AGCH channels are wanted by this Node B. The remaining steps 205 and 206 are the same as discussed with regard to FIG. 17 and which are known according to the NBAP protocol. The effectuated configuration or reconfiguration corresponds to step i in FIG. 10.

In other words, use is made of a re-configuration signal (305), which comprises information as to the cell identity of base station making the re-configuration signal and as to how many downlink control channels are wanted by the base station.

According to the invention, as exemplified by the description above, a more efficient utilization of E-AGCH resources are obtained while fast response times for UE's are offered in general. A more efficient use of the E-AGCH resources, leads to more frequent possibilities to send grant and shorter delays. Moreover, the present invention simplifies the handling in Node B and consequently the resources needed for the inventions implementation.

Downlink (DL) capacity in a WCDMA (Wideband Code Division Multiplex Access) cell is typically power and/or code limited. The less serving RL's in the cell, the less channelization codes are needed to transmit the absolute grants, via E-AGCH. The invention limits the configured codes based on number of serving RL's in the cell and whether both 2 ms/10 ms TTI is supported or not.

Figure 4:
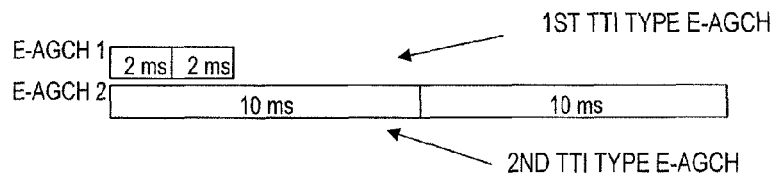
FIG. 4 shows a E-AGCH channel arrangement according to a first embodiment of the invention.
Figure 5:
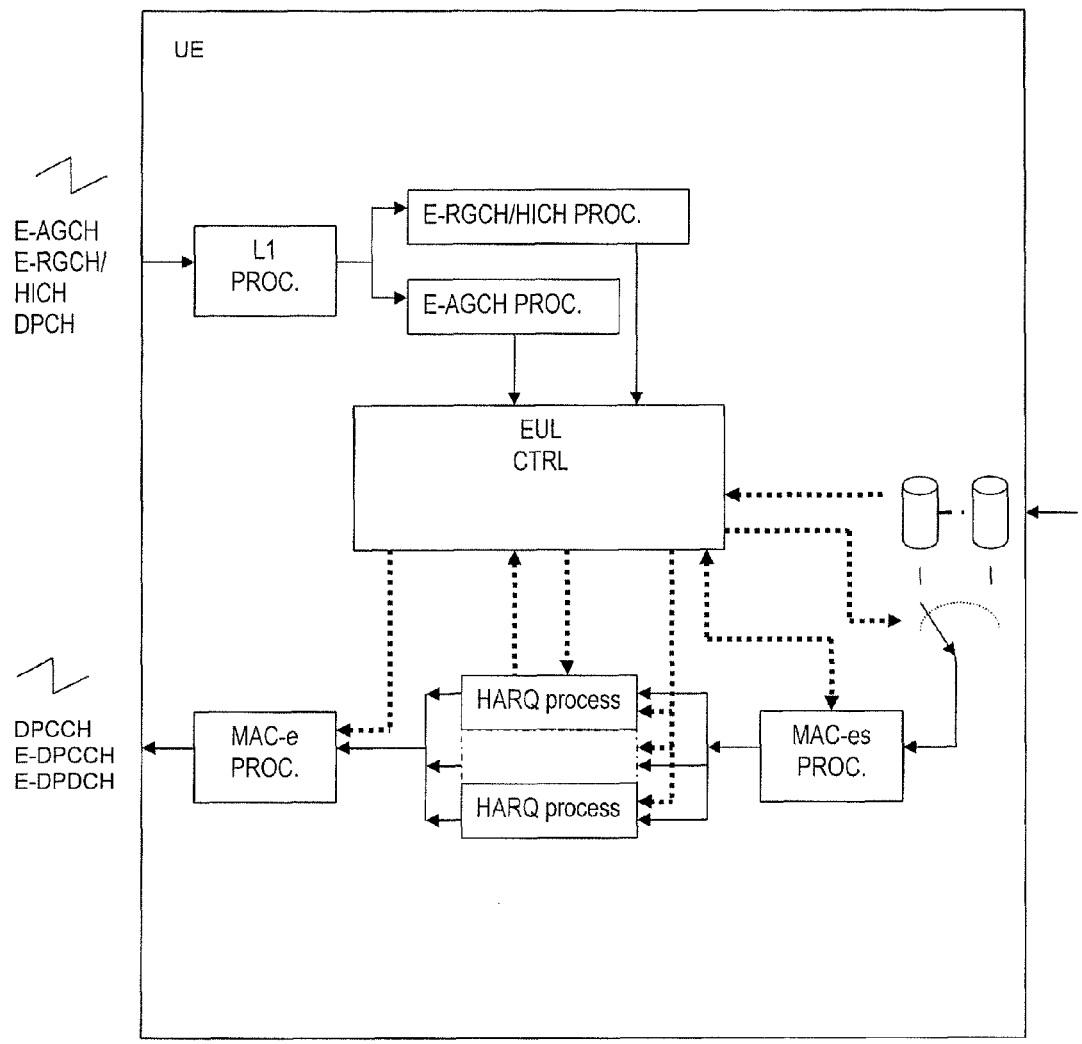
FIG. 5 shows a user entity according to an embodiment of the invention.

In FIG. 5, a user entity UE according to the invention is shown. The user entity comprises L1 processing means, E-RGCH/E-HICH processing means, E-AGCH processing, EUL control means, EUL ctrl, HARQ process stages 1-$m$ for HARQ (Hybrid Automatic Repeat Request) processes 1-$m$ associated with the user entity (UE), and Media Access Control (MAC-e PROC) processing means, for communicating over DPCCH, E-DPCCH, and E-DPDCH channels There is moreover provided buffers, I, connected with higher protocol stacks of the user entity.

Figure 6:
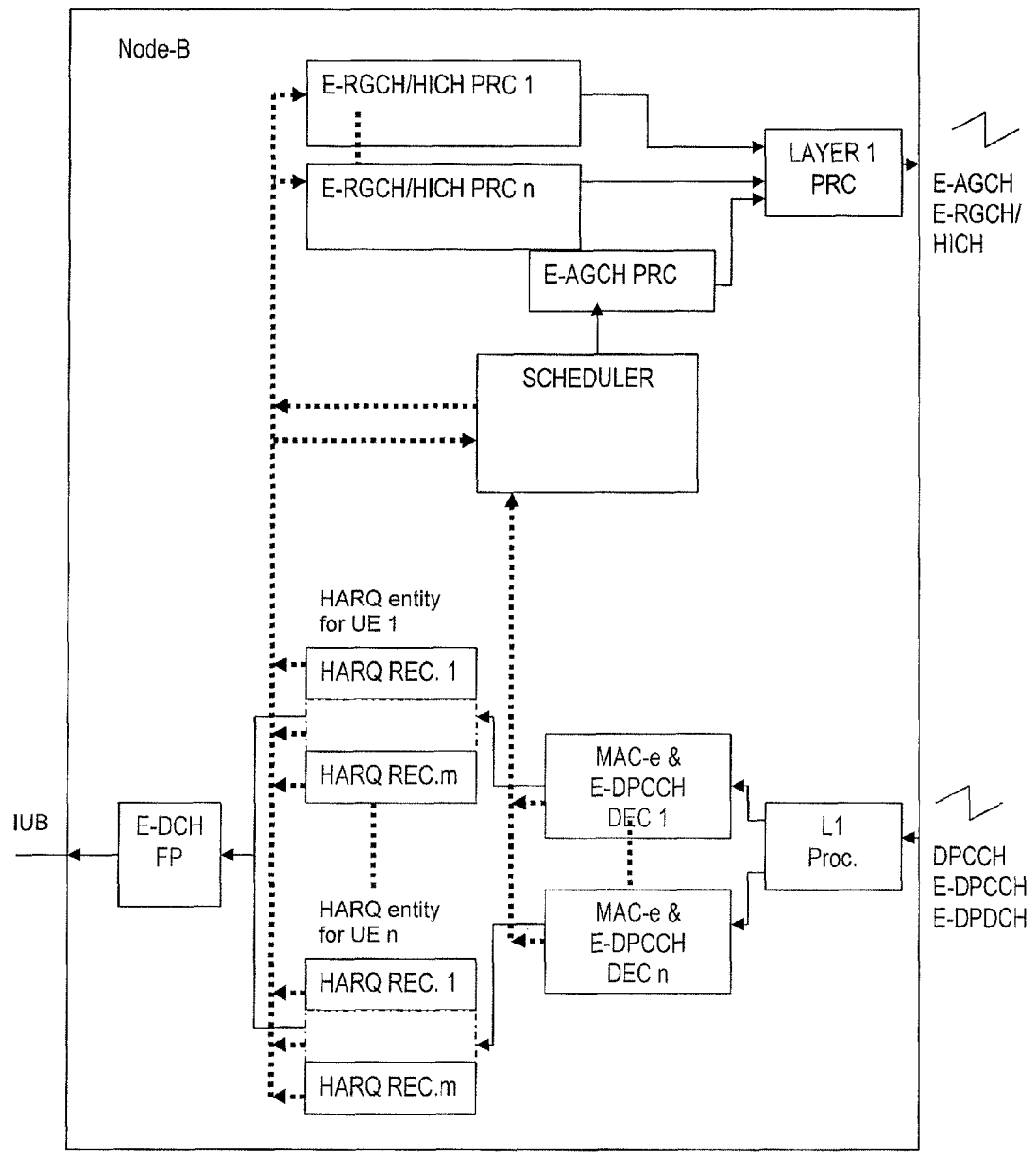
FIG. 6 shows a Node B according to an embodiment of the invention.

In FIG. 6, an exemplary base station according to the invention is shown, also denoted Node B, being capable of operating both as a serving base station and as a non-serving base station. The base station comprises E-RGCH/E-HICH processing (PRC) stages 1-$n$, layer 1 processing, E-AGCH processing, a scheduler, respective HARQ entities for user entities 1-$n$, each HARQ entity comprising plurality of HARQ receivers for receiving packets 1-$m$ according to the HARQ process for each user entity. Node B moreover comprises Layer 1 processing means for communicating over E-AGCH and E-RGCH channels over the air interface, L1 processing means for communicating over DPCCH, E-DPCCH and E-DPDCCH channels. Moreover, the base station comprises E-DPCH FP means for communicating over the iub interface. MAC-e EDPCCH decoding means 1-$n$ is provided for HARQ entities for UE 1-$n$. According to the invention, the method steps concerning Node B according to the invention may be implemented as a programme in the scheduler.

According to the first embodiment of the invention, there is provided a high speed uplink base station, adapted for communication on at least one downlink control channel (E-AGCH) on which mobile user entities are scheduled to receive absolute grants, the downlink control channel being arranged into transmission intervals corresponding to a first interval (P1) or a second interval (P2), the possible start of a first transmission interval (P1) being defined by a period corresponding to an integer number times the duration of the first transmission interval from a predefined (t1) frame on an additional control channel (P-CCPCH), the possible start of a second transmission interval (P2) being defined by a period corresponding to an integer number times the duration of the second transmission interval (P2) from the predefined (t1) frame on an additional control channel (P-CCPCH), wherein the base station is adapted to communicate with first type user entities (UE1) exclusively being able to communicate in the first transmission intervals (P1) and with second type user entities (UE2) being able to communicate in the second transmission intervals (P2), the base station is adapted for carrying out the steps of arranging or re-arranging (ii; 11$ii$-16$ii$, 27$ii$) a first downlink control channel having transmission intervals of exclusively the first interval (10 ms) and arranging or rearranging a second downlink control channel having transmission intervals of exclusively the second interval (2 ms);

assigning or re-assigning user entities to respective arranged downlink control channels (v), while scheduling (x) traffic for assigned user entities.

According to the second embodiment of the invention, there is provided a high speed uplink base station, adapted for communicating at least one downlink control channel (E-AGCH) on which mobile user entities are scheduled to receive absolute grants, the downlink control channel being arranged into transmission intervals corresponding to a first interval (P1) or a second interval (P2), the possible start of a first transmission interval (P1) being defined by a period corresponding to an integer number times the duration of the first transmission interval from a predefined (t1) frame on an additional control channel (P-CCPCH), the possible start of a second transmission interval (P2) being defined by a period corresponding to an integer number times the duration of the second transmission interval (P2) from the predefined (t1) frame on the additional control channel (P-CCPCH), wherein the base station is adapted to communicate with first type user entities (UE1) exclusively being able to communicate in the first transmission intervals (P1) and with second type user entities (UE2) being able to communicate in the second transmission intervals (P2), wherein the base station is adapted for carrying out the steps of calculating the load on each configured channel (iii);

assigning (vi) or re-assigning user entities to respective arranged downlink control channels (vi), while scheduling (x) traffic for assigned user entities on at least a given channel having transmission intervals of the first interval (P1) and/or the second interval (P2), whereby the proportion of first intervals (P1) to second interval (P2) varies dynamically.

ABBREVIATIONS

DL Downlink
E-AGCH Enhanced Absolute Grant Channel
E-DCH Enhanced Dedicated Channel
E-TFCIE-DCH Transport Format Combination Indicator
HSUPA High Speed UL Packet Access
NBAP Node B Application
RAB Radio Access Bearer
RAN Radio Access Network
RL Radio Link
RLS Radio Link Set
RNC Radio Network Controller

REFERENCES

NBAP, 25.433 Release 6 (or later)
E-AGCH description: 25.211-214 Release 6 (or later)
Scheduling Grants: 25.321 Release 6 (or later)

The invention claimed is:

1. A method for operating a high speed uplink base station, comprising:
arranging or rearranging, by a base station, at least one downlink control channel (E-AGCH) on which mobile user entities are scheduled to receive absolute grants, the downlink control channel being arranged into transmission intervals corresponding to a first interval (P1) or a second interval (P2), the possible start of a first transmission interval (P1) being defined by a period corresponding to an integer number times the duration of the first transmission interval from a predefined (t1) frame on an additional control channel (P-CCPCH), the possible start of a second transmission interval (P2) being defined by a period corresponding to an integer number times the duration of the second transmission interval (P2) from the predefined (t1) frame on an additional control channel (P-CCPCH);
wherein the base station is adapted to communicate with first type user entities (UE1) exclusively being able to communicate in the first transmission intervals (P1) and with second type user entities (UE2) being able to communicate in the second transmission intervals (P2), the method further comprising the steps of
arranging or rearranging a first downlink control channel (E-AGCH) having transmission intervals of exclusively the first interval (10 ms) and arranging or re-arranging a second downlink control channel (E-AGCH) having transmission intervals of exclusively the second interval (2 ms);
assigning or re-assigning user entities to respective arranged downlink control channels, while scheduling traffic for assigned user entities.

2. The method according to claim 1, wherein the method comprises the further step of cooperating in configuring or re-configuring downlink control channels, whereby E-AGCH downlink control channels are added or deleted for the base station.

3. The method according to claim 2, wherein
if one downlink control channel code is configured, arrange the downlink control channel as a mixed channel having both the first (P1) and second interval (P2); and
if two downlink control channel codes are configured, arranging the downlink control channel codes as clean channels, that is, each respective channel having exclusively intervals of the first interval (P1) or the second interval (P2), one downlink control channel having the first interval (P1), the second downlink control channel having the second interval (P2).

4. The method according to claim 3, when if at least two downlink control channels are configured, the step of assigning further comprises:
assigning or re-assigning UE's exclusively capable of using the first interval (P1)—first interval UE's—to the first, clean, downlink control channel; and
assigning or re-assigning UE's capable of using at least the second interval (P2)—second interval type UE's—to the second, clean, downlink control channel.

5. The method according to claim 3, wherein if traffic demand is such that more than two downlink control channels are configured, the method comprising the further steps of
arranging the third downlink control channel as a mix channel having first transmission intervals (P1) interrupted by second transmission interval's (P2);
at least assigning a number of first type user entities (UE1) to the first downlink control channel and at least assigning a second number of second type user entities (UE2) to the second downlink control channel, while
at least assigning a third number of first type user entity (UE1) to first transmission intervals of the third downlink control channel and a fourth number of second type user entity (UE2) to the second transmission intervals of the third downlink control channel.

6. The method according to claim 3, wherein the proportion of first intervals (P1) to second interval (P2) is scheduled so that the proportion varies dynamically.

7. The method according to claim 2, wherein if more than two downlink control channels are configured, arranging (16ii) at least a first and a second downlink control channel as clean channels the first downlink control channel having a first transmission interval (P1, P2) the second downlink control channel having a second transmission interval and the third downlink control channel having either the first or the second transmission interval, this interval being predetermined (P1, P2).

8. The method according to claim 2, wherein if more than two downlink control channels are configured, arranging at least a third downlink control channel as a mix channel.

9. The method according to claim 8, the method comprising the further steps of assessing the largest transmission interval of the user entities;
arranging a first downlink control channel having transmission intervals on a clean channel having transmission interval corresponding to the assessed largest need among the user entities.

10. The method according to claim 2, wherein if two downlink control channels are configured, arranging one clean channel according to the transmission interval (P1, P2) of the largest need and arrange the other downlink control channel code as a mixed channel having both the first and second interval (P1, P2).

11. The method according to claim 2, wherein if four downlink control channels are configured arranging one clean channel according to the transmission interval (P1, P2) of the largest need; one clean channel of first interval (P1); one clean channel of second interval (P2) and one mix channel.

12. The method according to claim 2, the method additionally comprising the step of calculating the load on all configured downlink control channels, wherein
if more downlink control channels are available for a user entity (UE1, UE2) being capable of a given transmission interval (P1, P2), assigning a user entity to the downlink control channel comprising the given transmission interval—which the user entity is capable of transmitting on—having the lowest load.

13. The method according to claim 12, wherein the load corresponds to the number of assigned user entities to a given downlink control channel.

14. The method according to claim 2 wherein use is made of a re-configuration signal, which comprises information as to the cell identity of the base station making the re-configuration signal and as to how many downlink control channels are wanted by the base station.

15. The method according to claim 1, wherein the downlink control channels are Enhanced Absolute Grant channels.

16. A method for operating a high speed uplink base station, comprising:
arranging or rearranging, by a base station, at least one downlink control channel (E-AGCH) on which mobile user entities are scheduled to receive absolute grants, the downlink control channel being arranged into transmission intervals corresponding to a first interval (P1) or a second interval (P2), the possible start of a first transmission interval (P1) being defined by a period corresponding to an integer number times the duration of the first transmission interval from a predefined (t1) frame on an additional control channel (P-CCPCH), the possible start of a second transmission interval (P2) being defined by a period corresponding to an integer number times the duration of the second transmission interval (P2) from the predefined (t1) frame on an additional control channel (P-CCPCH);

calculating the load on each configured channel;

assigning or re-assigning user entities to respective arranged downlink control channels, while scheduling traffic for assigned user entities on at least a given channel having transmission intervals of the first interval (P1) and/or the second interval (P2), whereby the proportion of first intervals (P1) to second interval (P2) varies dynamically.

17. The method according to claim 16, wherein the method comprises the further step of cooperating in configuring or re-configuring downlink control channels, whereby downlink control channels are added or deleted for the base station.

18. The method according to claim 16, wherein the scheduling is performed more often than the step of assigning.

19. The method according to claim 16, wherein the load on each configured channel is calculated, by calculating a load value for each user entity assigned to the channel; and
calculating the load on a given downlink control channel as a cumulative load value for a given channel after a user entity has been assigned to or has left the given channel, and
incoming user entities being assigned on the channel having the lowest load.

20. The method according to claim 16, wherein the load on each configured channel is calculated, by using a compensation value for each user entity according to the amount of absolute grants being transmitted for that particular user entity within a moving time window.

21. The method according to claim 20, wherein the load value is compensated with a weight value for user entities capable of using the second interval, the weight value being larger than one.

22. The method according to 16, wherein the downlink control channel is scheduled such that the frame layout may be scheduled during a period such that the downlink control channel only includes the first interval (P1), the downlink control channel only includes the second interval (P2); or the downlink control channel being scheduled such that it includes a mix of the first and second interval.

23. A high speed uplink base station, adapted to:
communicate on at least one downlink control channel (E-AGCH) on which mobile user entities are scheduled to receive absolute grants, the downlink control channel being arranged into transmission intervals corresponding to a first interval (P1) or a second interval (P2), the possible start of a first transmission interval (P1) being defined by a period corresponding to an integer number times the duration of the first transmission interval from a predefined (t1) frame on an additional control channel (P-CCPCH), the possible start of a second transmission interval (P2) being defined by a period corresponding to an integer number times the duration of the second transmission interval (P2) from the predefined (t1) frame on an additional control channel (P-CCPCH), wherein the base station is adapted to communicate with first type user entities (UE1) exclusively being able to communicate in the first transmission intervals (P1) and with second type user entities (UE2) being able to communicate in the second transmission intervals (P2);

initiate the arranging or re-arranging a first downlink control channel having transmission intervals of exclusively the first interval (10 ms) and arranging or re-arranging a second downlink control channel having transmission intervals of exclusively the second interval (2 ms);

assign or re-assign user entities to respective arranged downlink control channels, while schedule (x) traffic for assigned user entities.

24. A high speed uplink base station, adapted to:
communicate at least one downlink control channel (E-AGCH) on which mobile user entities are scheduled to receive absolute grants, the downlink control channel being arranged into transmission intervals corresponding to a first interval (P1) or a second interval (P2), the possible start of a first transmission interval (P1) being defined by a period corresponding to an integer number times the duration of the first transmission interval from a predefined (t1) frame on an additional control channel (P-CCPCH), the possible start of a second transmission interval (P2) being defined by a period corresponding to an integer number times the duration of the second transmission interval (P2) from the predefined (t1) frame on the additional control channel (P-CCPCH), wherein the base station is adapted to communicate with first type user entities (UE1) exclusively being able to communicate in the first transmission intervals (P1) and with second type user entities (UE2) being able to communicate in the second transmission intervals (P2);

calculate the load on each configured channel;

assign or re-assign user entities to respective arranged downlink control channels (vi), while schedule traffic for assigned user entities on at least a given channel having transmission intervals of the first interval (P1) and/or the second interval (P2), whereby the proportion of first intervals (P1) to second interval (P2) varies dynamically.

* * * * *